Aug. 11, 1931.  C. C. HANSEN  1,818,393

FEEDING DEVICE FOR ROCK DRILLS

Filed May 2, 1930

INVENTOR.
Charles C. Hansen
BY
HIS ATTORNEY

Patented Aug. 11, 1931

1,818,393

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

FEEDING DEVICE FOR ROCK DRILLS

Application filed May 2, 1930. Serial No. 449,225.

This invention relates to rock drills, but more particularly to a feeding device for rock drills.

It is an object of this invention to enable a rock drill to be fed toward the work at the proper speed. To this end the invention is designed so that the feed screw of a rock drill will cease to rotate if the rotating motor drives the screw too rapidly.

Other objects will be in part obvious and in part pointed out hereinafter.

Figure 2:
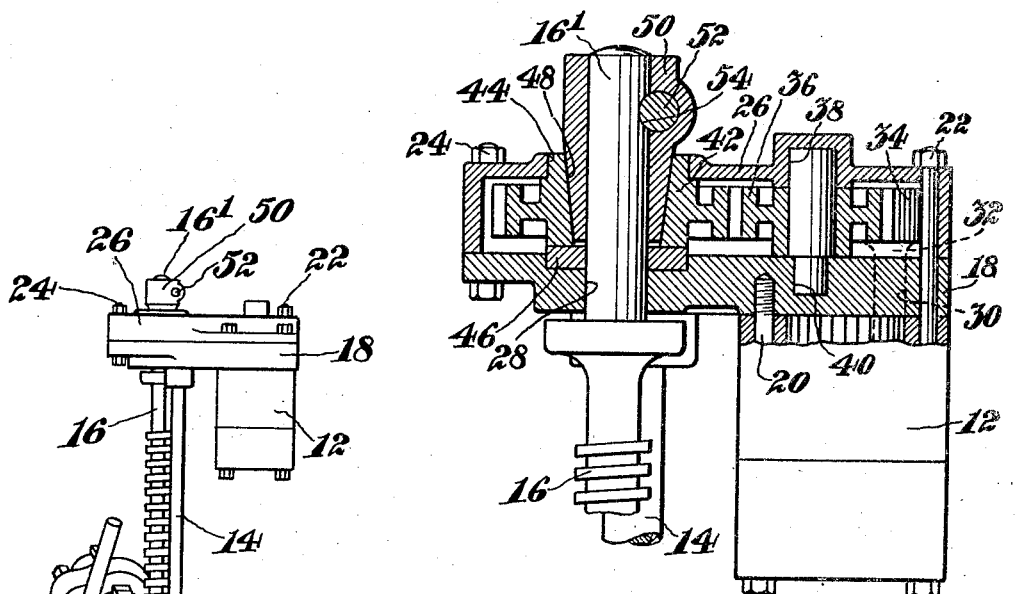
Figure 1:
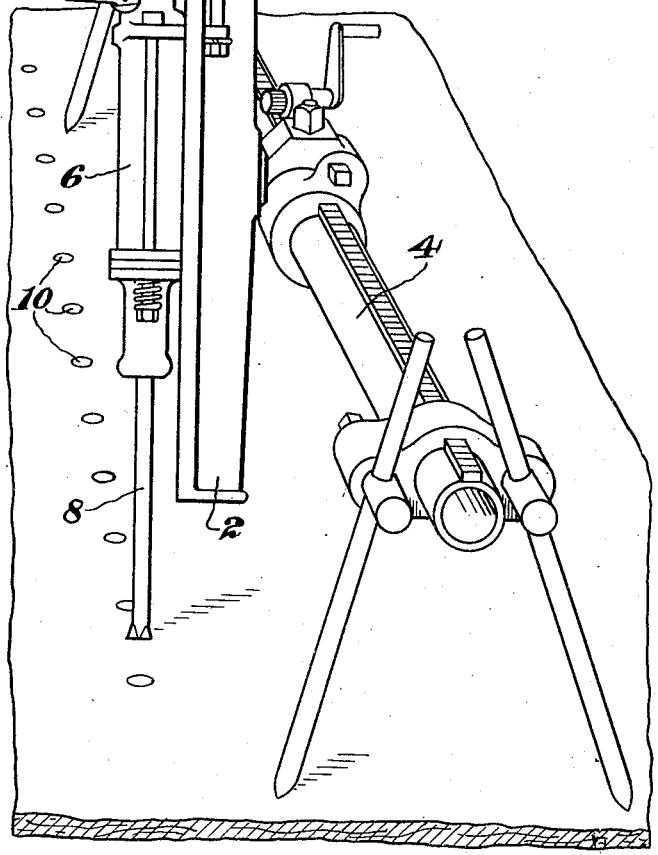

The objects above referred to are obtained by the mechanism shown in the accompanying drawings, in which, Figure 1 is a perspective view of a rock drill mounted on a quarry bar, and Figure 2 is a side view of the rock drill feed motor partly in section.

Referring more particularly to the drawings, 2 designates a rock drill shell or cradle mounted in the well known manner on a quarry bar 4. The quarry bar and mountings need not be described in detail, since they form no part of this invention. Mounted on the shell 2 is a rock drill 6 provided with a drill steel or working implement 8.

In drilling a row of holes as shown at 10 in the drawings, it is desirable to relieve the operator from the labor of feeding the rock drill toward the rock as the holes are drilled and of retracting the rock drill from the drill holes. Heretofore small motors of any suitable type have been used to do the work of feeding the drill forward and of retracting it from the drill hole. However, such motors are apt to cause trouble, unless watched closely, for in many cases they tend to feed the rock drill too rapidly against the work, causing damage to the rock drill and the associated mechanism. A skilled operator is able to feed the drill at the proper speed due to long experience. In order to protect the drill and to eliminate the necessity for the attention of a skilled operator the present invention was devised.

A motor 12 mounted on the side rods 14 is attached to a feed screw 16 by means of a gear train. The feed screw 16 is attached at the lower end of the shell 2 in such a manner that it may rotate freely about its own axis, but so that longitudinal movement of the feed screw is impossible except for a slight amount of longitudinal play between the feed screw and its fastenings (not shown).

The motor 12 which will not be described in detail since it may be of any well known type is secured to a back plate 18 by means of bolts 20 and 22. The bolt 22 in conjunction with the bolt 24 also secures the face plate 26 to the back plate 18 with a gear train between the back plate and the face plate. An aperture 28 in the back plate permits the passage of a feed screw shank 16'. Another aperture 30 is formed in the back plate 18 to allow the passage of the driven shaft 32 of the motor 12. A gear 34 keyed to the shaft 32 engages a gear 36, which is provided with bearing surfaces 38 and 40, in the face plate 26 and the back plate 18 respectively, the gear 36 meshes with a gear 42 which rotates in an aperture 44 in the face plate 26 and is supported on a wearing plate 46 which is embedded in the back plate 18. The gear 42 is bored centrally as at 48 and the bore 48 is tapered as shown. The bushing 50 is secured to the feed screw shank 16' by means of a pin 52 which passes transversely through the bushing and a groove 54 in the feed screw shank. The lower end of the bushing 50 is tapered to substantially fit the tapered bore 48 in the gear 42.

It can readily be seen that if only a small amount of taper is given to the surfaces referred to, a small amount of pressure tending to force the bushing 50 into the gear 42 will cause a great amount of friction between the bushing and the gear. This friction will be sufficient to cause the motor 12, operating through the shaft 30 and gears 36 and 42, to rotate the feed screw 16.

In the operation of the device the motor is mounted rigidly on the side rods 14. Since the side rods are rigidly mounted on the shell 2 the motor, side rods, and shell are for all practical purposes integral. When the motor is placed on the side rods the shank of the feed screw 16 is passed through the aperture 28 and the bushing 50 adjusted on the shank 16'. Assuming that the drill has been mounted on the quarry bar, and put in operation the motor 12, causes the feed screw to rotate and drive the rock drill downward, as the holes are drilled, if the motor 12 operates too rapidly or if a harder strata of stone is encountered by the drill steel, the feed screw will tend to force itself upward due to the impossibility of driving the rock drill downward. This tendency of the feed screw to move upward away from the drill relative to the shell 2 will cause the tapered bushing 50 to be lifted out of the tapered aperture 48 in the gear 42 thereby disengaging the motor and the feed screw. When this occurs the forward feeding of the rock drill by the feed screw is immediately stopped and the rock drill feeds itself forward only by its own weight. When the rock drill has advanced sufficiently far under its own weight to require further feeding by the motor the rock drill naturally draws the feed screw 16 downward and with it the tapered bushing 50, thereby causing the bushing 50 to re-engage with the gear 42, whereupon mechanical feeding of the drill 6 is once more begun. The operation above described is repeated whenever necessary by the clutch comprising the tapered cone and correspondingly tapered gear. Thus the objects above referred to are obtained.

I claim:—

1. In a feeding device for rock drills, the combination of a motor and a rock drill shell, a rock drill slidable in the shell, a feed screw for the rock drill, driving means for transmitting movement of the motor to the feed screw, a casing for the driving means, a driven member supported in the casing and spaced from the feed screw, and means on the feed screw cooperating with said driven member to form a clutch, said clutch being maintained in engagement by the weight of the rock drill.

2. In a feeding device for rock drills, the combination of a motor and a rock drill shell, a rock drill slidable in the shell, a feed screw for the rock drill, driving means for transmitting movement of the motor to the feed screw, a casing for the driving means having apertures through which the feed screw projects, a driven member journalled in one of said apertures and spaced from the feed screw, a wearing plate in the casing for supporting the driven member, and a tapered bushing secured to the feed screw and cooperating with said driven member to form a clutch, said clutch being maintained in engagement by the weight of the rock drill.

3. In a feeding device for rock drills, the combination of a motor and a rock drill shell, a rock drill slidable in the shell, a feed screw for the rock drill movable longitudinally with respect to the shell, driving means for transmitting movement of the motor to the feed screw, a casing for the driving means having apertures through which the feed screw projects, a driven member encircling the feed screw having a tapered bore and a portion journalled in one of said apertures, said tapered bore being spaced from the feed screw, a wearing plate in the casing for supporting the driven member, and a tapered bushing secured to the feed screw and cooperating with the tapered bore of the driven member to form a clutch, said clutch being maintained in engagement by the weight of the rock drill and disengaged by rearward movement of the feed screw relative to the shell.

In testimony whereof I have signed this specification.

CHARLES C. HANSEN.